S. S. JACKSON.
FILLING FEELER FOR LOOMS.
APPLICATION FILED SEPT. 11, 1916.

1,284,691.

Patented Nov. 12, 1918.
2 SHEETS—SHEET 1.

Witness:
Oscar F. Hill

Inventor:
Simeon S. Jackson
By Chas. F. Randall
Attorney.

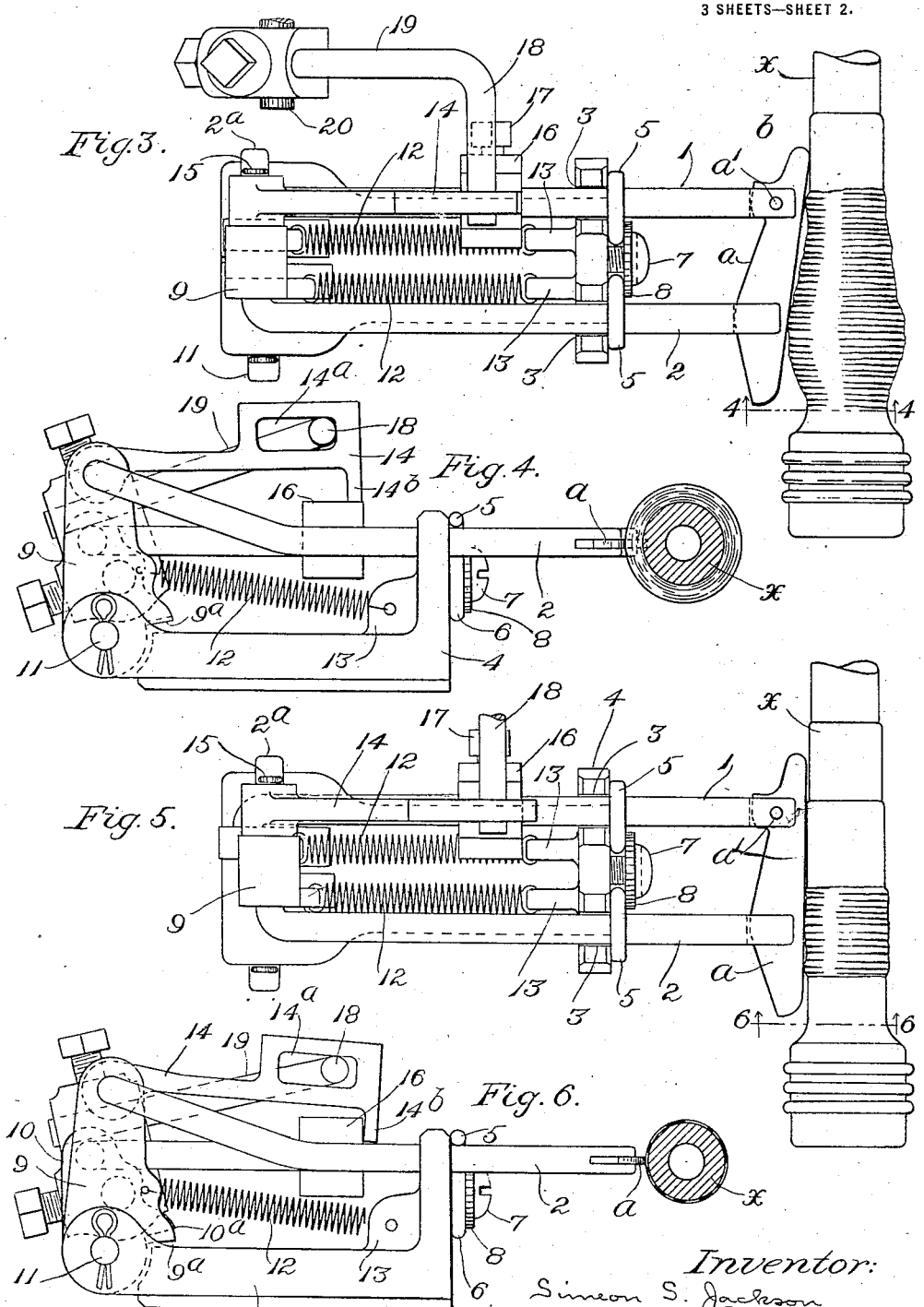

S. S. JACKSON.
FILLING FEELER FOR LOOMS.
APPLICATION FILED SEPT. 1, 1916.

1,284,691.

Patented Nov. 12, 1918.
3 SHEETS—SHEET 3.

Witness:
Oscar F. Hill

Inventor:
Simeon S. Jackson
by Chas. F. Randall
Attorney.

UNITED STATES PATENT OFFICE.

SIMEON S. JACKSON, OF BOSTON, MASSACHUSETTS, ASSIGNOR TO THE STAFFORD COMPANY, OF READVILLE, BOSTON, MASSACHUSETTS, A CORPORATION OF NEW JERSEY.

FILLING-FEELER FOR LOOMS.

1,284,691.  Specification of Letters Patent.  Patented Nov. 12, 1918.

Application filed September 11, 1916. Serial No. 119,353.

*To all whom it may concern:*

Be it known that I, SIMEON S. JACKSON, a subject of Great Britain, residing at Readville, Boston, in the county of Suffolk, State of Massachusetts, have invented a certain new and useful Improvement in Filling-Feelers for Looms, of which the following is a specification, reference being had therein to the accompanying drawings.

The invention has relation to measuring filling-feelers of the differential class. Its objects are to provide improved differential measuring feeler-devices adapted to indicate the arrival of a predetermined stage in the depletion of the supply of weft or filling contained in a loom-shuttle, with greater certainty and uniformity than heretofore under ordinary mill conditions, in the hands of mill-help of ordinary skill; to provide differential measuring feeler-devices free from liability to erratic actions as a result of minor variations or irregularities in the initial winding of the weft or filling upon the filling-carrier, or as a result of differences in the position of the shuttle in the shuttle-box at the time of the feeling action; to provide differential feeler-devices having measuring and indicating action of such accuracy and reliability as to render it safe and practicable to continue the weaving-off of the weft or filling from the filling-carrier occupying the shuttle down to a very small predetermined minimum remaining quantity, whereby it is rendered practicable to reduce feeler-waste to the utmost; and to provide improved differential feeler-devices so constituted that weakening or cutting of the weft or filling contents of a shuttle will not result from the feeler contact.

The invention combines in a differential feeler-device, with differential devices which control the devices through which a change is called in the operation of a loom, (such control usually in practice being effected through coöperation of the differential devices with the so-called controller of the change-calling devices,) a contact-member coacting with the said differential devices and through which in a feeling action the shuttle-contents determine the differential interrelationship of the differential devices. The said contact-member is adapted to aline itself parallel in direction with the general longitudinal contour of those portions of the shuttle-contents which touch its working face. In thus alining itself, the said contact-member operates to determine the differential relations of the respective members of the differential devices in substantial accord with any differences there may be in the various radii of the contacting portions of the shuttle-contents.

More specifically, the invention includes the combination, with members that are adapted to have a differential action with relation to each other, preferably though not necessarily in all cases slides or plungers, of a differentiating-actuator or transmitter through which such members are positioned differentially at the time of a feeling action, such differentiating-actuator or transmitter comprising a differentiating-swivel which at a feeling action is controlled as to its angular position by the relative lengths of the radii of the different contacting portions of the filling-mass, or contacting-portions of the filling-carrier and filling-mass, as the case may be. By "contacting portions" are meant those portions which are presented against the working face or edge of the said swivel at different points in the length of such face or edge. The angular position of the swivel determines the differential relationship of the differential members with respect to each other. In successive feeling actions during the depletion of the portion of the filling-mass that is presented against the differentiating-swivel, as the variations in the said relative lengths cause the angularity of the said swivel to change progressively, the members aforesaid are caused to pass through successive stages of differential interrelationship until eventually the change in the working of the loom is called or indicated by the feeler-devices.

The invention is capable of varied embodiments. In the accompanying drawings the contact-member, actuator or transmitter, or differentiating-swivel, aforesaid is shown combined with differential devices and coöperating parts which in general are similar in character, construction, and general mode of operation, to those shown, described, and claimed in other applications for U. S. Letters Patent. It is to be understood that the invention is capable of application in connection with feeler-devices of various other specific constructions and that, so far as its broad phases are concerned, the invention is not limited to the use of the said special member in connection with devices of the precise character, construction, and specific mode of operation of those shown. In its more specific phases the invention includes various combinations of the special member aforesaid with the elements or members of the illustrated filling-feeler devices.

In the accompanying drawings,—

Fig. 3 is a plan view, on an enlarged scale, of the feeler devices of Fig. 1 and a portion of the controller, showing an intermediate stage in the working, with a comparatively small amount of filling remaining upon the filling-carrier.

Fig. 4 is an elevation with the filling-carrier in cross-section on line 4, 4, of Fig. 3.

Fig. 5 is a plan view showing the action when the residue of filling upon the filling-carrier is reduced to the pre-determined minimum.

Fig. 6 is an elevation with the filling-carrier in cross-section on line 6, 6, of Fig. 5.

Figure 1:
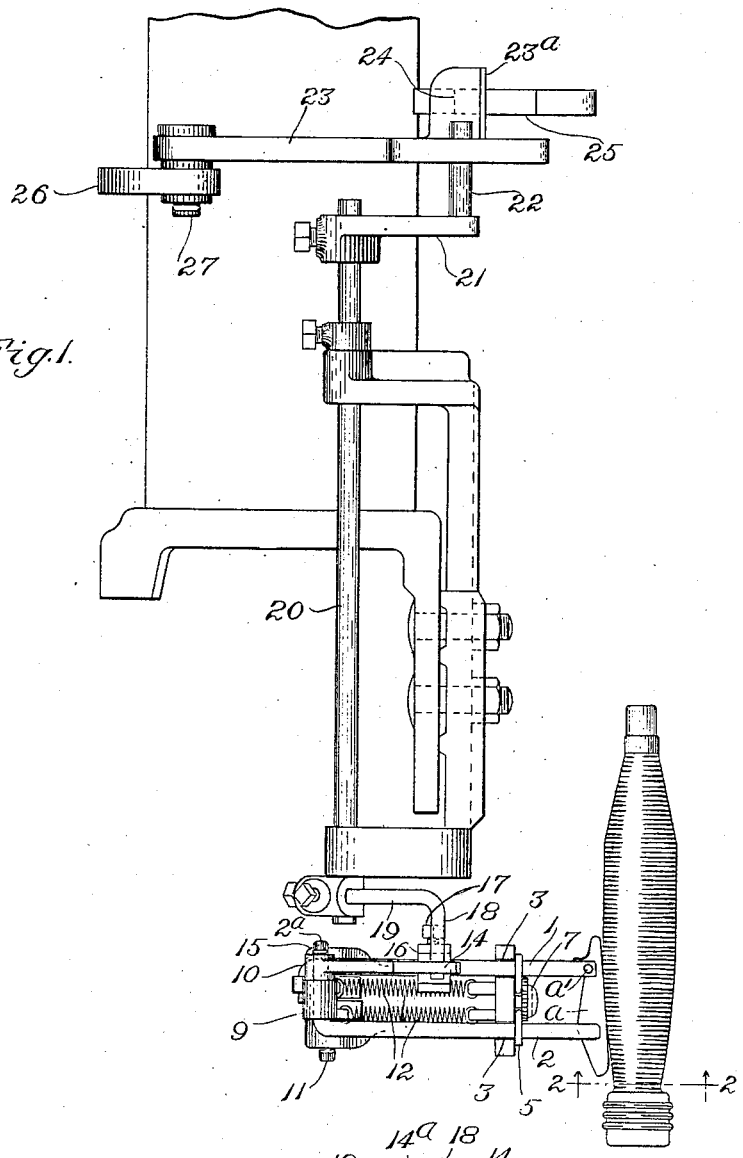
Figure 1 is a plan view of a feeler-mechanism including filling-feeler devices containing one embodiment of the invention the said view showing certain portions of the framework of a loom. It shows, also, a bobbin carrying a full-sized load of weft or filling, and the action which takes place when a full-sized filling-mass is carried against the feeler-devices by the forward stroke of the lay.
Figure 2:
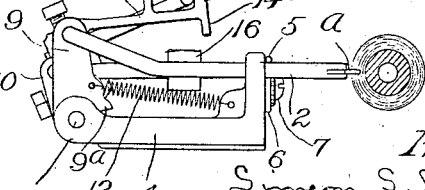
Fig. 2 is a view in elevation of the parts of Fig. 1, with the filling-carrier in section on line 2, 2, of Fig. 1.
Figure 7:
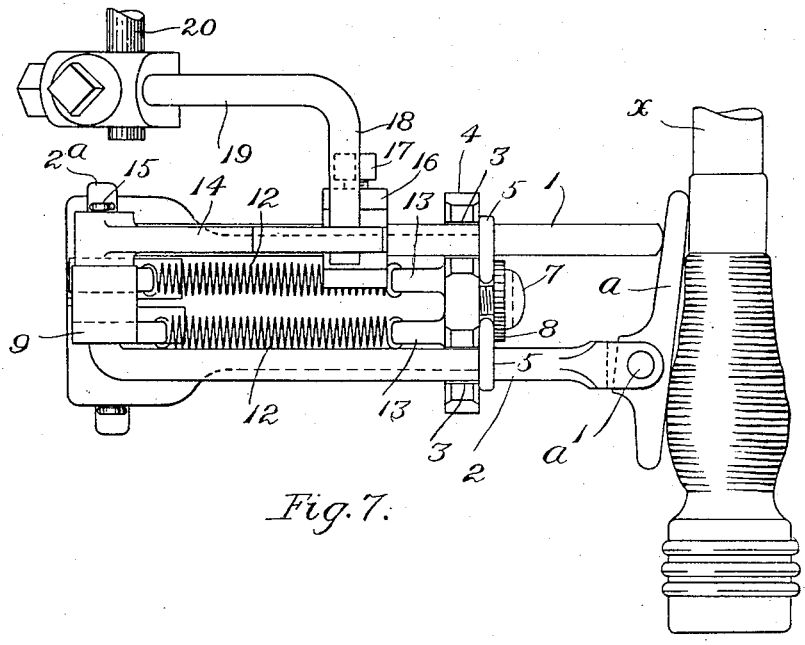
Fig. 7 is a view corresponding with Fig. 3, showing a second embodiment of the invention.

The part or member $a$ is the contact-member, differentiating-transmitter, and differentiating-swivel, aforesaid. In the present instances it is combined operatively with the differential-devices by being arranged to coöperate with the rear ends of the slides or plungers 1 and 2. The said slides or plungers, together with the controller-rest or latch 14 and controller-rest-governor 16 which are operatively combined therewith, constitute the main elements of the differential-devices of the feeler-devices shown in the drawings. The rearwardly presented working face or edge of the part or member $a$ receives the impact and pressure of the shuttle-contents in a feeling action. The said face or edge may be of any convenient and approved width vertically. It is straight lengthwise, in the present instance. In practice, in cases in which special modification of the results attained is desired, the shape of the said working face may be varied more or less to meet special needs in practice. Thus the said face may be stepped lengthwise, or may be more or less curved.

In each feeling action, as shown by Figs. 1, 3, 5, and 7, one effect of the impact and pressure of the shuttle-contents against the working face or edge of the part or member $a$ is to cause or insure an alinement of such working face or edge parallel in direction with the general longitudinal contour of the contacting portions of the said contents. This produces conformity in position angularly, in a horizontal or substantially horizontal plane, of the said working face to those portions of such contents which touch it at different points of its length. With its working face thus alined in parallelism with the said general longitudinal contour, the position of the part or member $a$ at the time of the feeling action may be one more or less exactly at right angles with the length of the slides or plungers, as in the case of a full bobbin and again in the case of a practically denuded one, or may be one at a greater or less angle of obliquity or inclination relative to said length, as when a tapering portion of the filling-mass, or an incompletely reduced remainder of the first-wound portion of filling, is presented to the working face of the contact-member. By this varied angularity the differential relationship of the slides or plungers 1 and 2 with respect to each other, and consequently of the controller-rest or latch and the controller-rest-governor with respect to each other, is varied progressively.

The mode and means of supporting the contact-member $a$ in the required working relations with the slides or plungers may vary in practice. Capacity to assume different angular positions in alining itself parallel with the general longitudinal contour of the shuttle-contents being required, such capacity is secured in the present instance by a pivotal engagement of the contact-member with the slides or plungers. Thus, in the present embodiments of the invention the contact-member occupies horizontal slots in the rear ends of the slides or plungers, with its working edge projecting rearwardly beyond the said rear ends, so that the shuttle-contents may strike thereagainst, and it is engaged by means of a pivot $a'$ with one slide or plunger, while its front edge is adapted to make loose rocking and sliding contact with the inner end-wall of the slot which it occupies in the other slide or plunger. In Figs. 1 to 6 the pivot $a'$ is applied in connection with indicating slide or plunger 1; in Fig. 7 such pivot is applied in connection with measuring slide or plunger 2.

In the case of the earlier feeler-devices aforesaid, in order to secure the required character of measuring differential action in the final stages of depletion of the filling upon the filling-carrier, the indicating slide or plunger 1 projects normally a short distance rearward beyond the measuring slide or plunger 2, namely, to an extent corresponding substantially with the ordinary taper of the cone-wind of the filling upon the filling-carrier, usually one-eighth of an inch. Correspondingly, in the present embodiments of the invention, the indicating portion of the contact-member or differentiating-swivel (in this instance the inner end thereof) projects normally to a similar extent rearward beyond the measuring portion thereof (in this instance the outer end thereof) as shown in Figs. 3 and 4.

Considered by themselves the slides or plungers and other elements of the differential devices, and the associated parts through which the required change in the operation of the loom is called, all as shown in the drawings, are substantially the same in general construction, and arrangement as in the earlier devices aforesaid, excepting that in the case of the latter the rear ends of the slides or plungers themselves receive directly the impact and pressure of the shuttle-contents, as already indicated herein.

In practice, the main differential members, preferably slides or plungers as aforesaid, the means and manner of supporting and guiding them in their movements, the means and manner of utilizing their differential action, and the controller-mechanism, may vary as found desirable or most convenient and practical. In the accompanying drawings the slides or plungers are in the form of light rods, cylindrical in cross-section. They rest in guide-bearings at 3, 3, in the rear upright portion of a feeler-stand 4, and are adapted to slide lengthwise in the said guide-bearings. The said guide-bearings are open-topped, to facilitate the application of the slides or plungers to such guide-bearings, and their removal therefrom, and the slides or plungers normally are kept in place within the said guide-bearings by means of the outturned ends 5, 5, of a holding-down piece 6. The latter is made of wire, with its intermediate portion bent into U-shape to fit around the stem of a clamping-screw 7, a washer 8 being interposed between the flanged head of the said screw and the body-portion of the holding-down piece, and the said stem being screwed into a threaded hole that is tapped in the said upright portion of the feeler-stand 4. The forward ends of the slides or plungers are shown as supported by being engaged pivotally with the upper portions of swinging arms 9, 10, which are mounted side by side upon a transversely-extending supporting pin 11 applied to the front portion of the feeler-stand 4. The said arms are adapted to swing forward and rearward around the said pin as the plungers are caused to move forward and rearward, and they control and guide the forward portions of the slides or plungers during such movements. The slides or plungers normally are held in their rearward positions by the tension of contracting spiral springs 12, 12, having their rear ends engaged with lugs 13, 13, upon the rear portion of the feeler-stand 4. In the illustrated construction, the extent of the rearward swinging movements of the arms 9, 10, and consequently the normal rearward positions of the slides or plungers 1 and 2, are determined through the contact of shoulders $9^a$, $10^a$, of the said arms with an adjacent portion of the feeler-stand.

The controller-rest 14, sometimes termed a latch, is shown as hung pivotally upon a lateral extension $2^a$ of the pivot or journal of slide or plunger 2 which engages the said slide or plunger with the arm 9, the said pivot or journal being extended sufficiently at the inner side of the arm 9 to receive upon it the hub-portion of the controller-rest or latch 14, and to receive also the fastening device, in this instance a cotter-pin 15, which keeps the controller-rest or latch in place upon the pivot or journal, and also keeps the pivot or journal properly in place within the bearing-portion of the arm 9.

The controller-rest-governor 16 is shown as a small block or collar mounted upon the slide or plunger 1, it operating as usual to support the rear end of the controller-rest or latch normally. The controller-rest or latch has as usual a downwardly-projecting toe $14^b$ to rest upon the top of the said block or collar. A clamping screw 17 provides for securing the collar 16 upon plunger 1 in the proper position of adjustment.

As heretofore, the outwardly-projecting finger 18 of the arm 19 at the outer end of the controller-rockshaft 20 enters the slot $14^a$ that is formed in the rear portion of the controller-rest 14, so that so long as the toe $14^b$ of the controller-rest rests upon the top of the block or controller-rest-governor 16 and thereby holds the controller-rest elevated as in Fig. 4, the said finger 18 and arm 19 are kept elevated, and thereby the arm 21 and finger 22 at the inner end of the controller-rockshaft, Fig. 1, keep the latch 23 elevated so that its engaging portion $23^a$ is kept clear of the path of the shoulder 24 of the weft-hammer 25, thus preventing any change from being called in the working of the loom. As heretofore, also, when in the final stage of depletion the progressive increase in the extent of movement of slide or plunger 1 over that of slide or plunger 2 in successive feeling-actions at last operates to take the controller-rest-governor 16 forward out from under the toe $14^b$ of the controller-rest, so that the latter is free to drop, the controller turns to the extent indicated in Fig. 6. Thereby the catch 23 is lowered so that its engaging portion $23^a$ may be engaged by the shoulder 24 of the weft-hammer, and the forward movement of the weft-hammer then operates to move the catch 23 forward, thereby swinging forward the arm 26 of the devices for calling or indicating the change in the working of the loom, the said catch being pivoted at 27 to the said arm 26. The construction and working in these respects are well known, and further explanation is unnecessary.

As heretofore in some cases, finger 18 in this instance is so adjusted in position with reference to the rear end-wall of slot 14$^a$ of controller-rest 14 that during the full-diameter stage of the filling-mass contained in the shuttle (see Figs. 1 and 2) the forward movement given to measuring slide or plunger 2 and the controller-rest by the feeling-action as the loom-lay goes forward carries said rear end-wall against the said finger. Thereby arm 19 of the controller either is swung upward so that the finger lifts the controller-rest slightly, or is held from swinging downward. Consequently, although during this stage the forward movement given to indicating slide or plunger 1 and the controller-rest-governor 16 by the feeling action operates to take the said governor forward out from under the toe 14$^b$ of the controller-rest, the controller-rest is prevented from dropping and the controller is kept from turning to call or indicate a change in the operation of the loom. As the lay goes rearward again, the controller-rest-governor shoots rearward in under the toe 14$^b$ before the controller-rest drops.

The extended working face of contact-member $a$ does not weaken or cut the coils or turns of filling upon the filling-carrier, however frequently the contact with such coils or turns may be repeated, the action in this respect being better than when narrow-ended slides or plungers make direct contact with the shuttle-contents. Should the filling happen to be wound with a ridge or bunch at a little distance from the head of the filling-carrier, some portion of the length of the said working face will be acted upon by the said ridge or bunch at every feeling action. Consequently, the filling uniformly will be woven off from every filling-carrier down to the predetermined thinness or closeness, without leaving upon the filling carriers the variable quantities of feeler-waste which ordinarily in practice are left by reason of the narrow ends of the feeler-slides or plungers missing the ridges or bunches, the frequency of such missing being increased by variations in the position of the shuttle lengthwise at the time of the feeling-action.

The invention retains the advantage of utilizing the surface of the filling-carrier as a datum for the measuring action.

In order to enable the feeling-action to take place close up to the head or base of the filling-carrier, the contact-member $a$ is formed with an extension projecting outward beyond the outer or measuring slide or plunger 2. This increases the range of the feeling and measuring action in the direction toward the said head or base, so as to obviate the liability to leave a bunch of filling of any great thickness adjoining the latter. Correspondingly, the contact-member $a$ is formed with an extension projecting inward beyond the inner or indicating slide or plunger 1. This increases the range of the feeling action in that direction. I find that the lever-like measuring-action of the contact-member, especially when considered in connection with the decrease in the angle of inclination resulting from the considerable distance or length between the point of impingement of the inner end of the contact-member against the filling-carrier and the place at which the remaining filling presses against the outer portion of the working face, gives a very delicate and at the same time accurate and otherwise improved feeling-action.

What is claimed as the invention is:—

1. In a differential filling-feeler device, the combination with differential devices through which a change in the operation of a loom is indicated, of a contact-member acted upon by the shuttle-contents and coacting with the differential devices conjointly in a feeling action to determine the differential interrelationship of the differential devices.

2. In a differential filling-feeler device, the combination with differential devices through which a change in the operation of a loom is indicated, of a contact-member adapted to aline itself parallel in direction with the general longitudinal contour of those portions of the shuttle-contents which touch its working face, and through the coaction of which with the differential devices conjointly in a feeling action the shuttle-contents determine the differential interrelationship of the differential devices.

3. In a differential filling-feeler device, the combination with the controller of devices through which a change in the operation of a loom is called, and differential devices which control the said controller, of a contact-member coacting with the differential devices conjointly and through which in a feeling-action the shuttle-contents determine the differential relationship of the differential devices.

4. In a differential filling-feeler device, the combination with the controller of devices through which a change in the operation of a loom is called, and differential devices which control the said controller, of a contact-member coacting with the differential devices conjointly and adapted to aline itself with its working face parallel in direction with the general longitudinal contour of those portions of the shuttle-contents which touch said working face, and through which in a feeling-action the shuttle-contents determine the differential relationship of the differential devices.

5. In a differential filling-feeler device, the combination with devices through which a change in the operation of a loom is called, and differential devices which control the said devices, of a differentiating-transmitter through which in a feeling-action the differential devices conjointly are positioned differentially by the shuttle-contents.

6. In a differential filler-feeling-device, the combination with devices through which a change in the operation of a loom is called, and differential devices which control the said devices, of a differentiating-transmitter controlled as to its angular position by the relative lengths of the radii of the different contacting portions of the shuttle-contents in a feeling action, and through which in a feeling-action the differential devices conjointly are positioned differentially by the shuttle-contents.

7. In a differential filling-feeler-device, the combination with the controller of devices through which a change in the operation of a loom is called, and differential devices which control the said controller, of a differentiating-transmitter through which in a feeling-action the differential devices conjointly are positioned differentially by the shuttle-contents.

8. In a differential filling-feeler-device, the combination with the controller of devices through which a change in the operation of a loom is called, and differential devices which control the said controller, of a differentiating-transmitter controlled as to its angular position by the relative lengths of the radii of the different contacting portions of the shuttle-contents in a feeling action, and through which in a feeling-action the differential devices conjointly are positioned differentially by the shuttle-contents.

9. In a differential filling-feeler-device, the combination with a controller, a controller-rest, and a controller-rest-governor, of a differentiating-transmitter through which in a feeling-action the shuttle-contents operate to cause the controller-rest and controller-rest-governor to coact differentially.

10. In a differential filling-feeler device, the combination with a controller, and differentially-acting latching means for said controller, of a differentiating actuator for said latching means through which in a feeling-action the shuttle-contents produce the differential action of the latching means and release of the controller.

11. In a differential filling-feeler device, the combination with a controller, members adapted to have a differential action, and controller-latching means combined with said members, of a differentiating actuator through which in a feeling action the shuttle-contents produce the differential action of the said members and the unlatching of the controller at the predetermined point in the depletion of the filling-supply contained in the shuttle.

12. In a differential filling-feeler device, the combination with a controller, differential slides or plungers, and controller-latching devices combined with said slides or plungers, of a differentiating-transmitter through which in a feeling-action the shuttle-contents produce the differential action of said slides or plungers and the unlatching of the controller at the predetermined point in the depletion of the filling-supply contained in the shuttle.

13. In a differential filling-feeler device, the combination with a controller, a controller-rest, a controller-rest governor, and differential slides or plungers by which said controller-rest and controller-rest-governor are actuated, of a differentiating-transmitter through which in a feeling-action the shuttle-contents actuate differentially the said slides or plungers.

14. In a differential filling-feeler device, the combination with a controller, differential slides or plungers, and controller-latching devices combined with said slides or plungers, of a contact member bridging the space between such slides or plungers with its working face presented in position to receive the pressure of the shuttle-contents, and through which in a feeling-action the shuttle-contents actuate differentially the slides or plungers and controller-latching devices.

15. In a differential filling-feeler device, the combination with a controller, differential members, and controller-latching devices combined with said members, of a differentiating-swivel bridging the space between such members with its working face presented in position to receive the pressure of the shuttle contents, and through which in a feeling-action the shuttle-contents actuate differentially the differential members and controller-latching devices.

16. In a differential filling-feeler device, the combination with a controller, differential slides or plungers, and controller-latching devices combined with said slides or plungers, of a differentiating-swivel bridging the space between such slides or plungers with its working face presented in position to receive the pressure of the shuttle-contents, and through which in a feeling-action the shuttle-contents actuate differentially the slides or plungers and controller-latching devices.

17. In a differential filling-feeler device, the combination with differential devices which control the controller of the devices through which a change is called in the operation of a loom, of a contact-member which in a feeling-action receives the pressure of the shuttle-contents and alines itself parallel in direction with the general longitudinal contour of those portions of such contents which touch its working face, and in thus alining itself positions the respective members of the differential devices differentially, in substantial accord with any differences there may be in the various radii of such portions.

18. In a differential filling-feeler device, the combination with devices through which a change in the operation of a loom is called, and devices, including differential members, which control the devices first mentioned, of a differentiating-transmitter through which in a feeling action the differential members are positioned differentially by the shuttle-contents, said differentiating-transmitter having an outward extension of its working face beyond the outer differential members.

19. In a differential filling-feeler device, the combination with a controller, differential slides or plungers, and controller-latching devices combined with said slides or plungers, of a contact-member bridging the space between such slides or plungers, with its working face presented in position to receive the pressure of the shuttle-contents and also extended outward beyond the outer slide or plunger, and through which contact-member in a feeling action the shuttle-contents actuate differentially the slides or plungers.

20. In a differential filling-feeler device, the combination with devices through which a change in the operation of a loom is called, and devices, including differential members, which control the devices first mentioned, of a differentiating-transmitter through which in a feeling action the differential members conjointly are positioned differentially by the shuttle-contents, said differentiating-transmitter having an extension of its working face extended inwardly beyond the inner member.

21. In a differential filling-feeler device, the combination with a controller, differential slides or plungers, and controller-latching devices combined with said slides or plungers, of a contact-member bridging the space between such slides or plungers with its working face presented in position to receive the pressure of the shuttle-contents and also extended inwardly beyond the inner member, and through which contact-member in a feeling-action the shuttle-contents actuate differentially the slides or plungers and controller-latch devices.

22. In a differential filling-feeler device, the combination with devices through which a change in the operation of a loom is called, and devices, including differential members, which control the devices first mentioned, of a differentiating-transmitter through which in a feeling-action the differential members conjointly are positioned differentially by the shuttle-contents, said differentiating-transmitter having an outward extension projecting outwardly beyond the outer member and also an inward extension projecting inwardly beyond the inner member.

23. In a differential filling-feeler device, the combination with a controller, differential slides or plungers, and controller-latching devices combined with said slides or plungers, of a contact-member bridging the space between such slides or plungers with its working face presented in position to receive the pressure of the shuttle-contents and also extended both outwardly beyond the outer member and also inwardly beyond the inner member, and through which contact-member in a feeling-action the shuttle-contents actuate differentially the slides or plungers and controller-latch devices.

In testimony whereof I affix my signature in presence of two witnesses.

SIMEON S. JACKSON.

Witnesses:
 CHAS. F. RANDALL,
 ELSIE A. BARTZSCH.

Copies of this patent may be obtained for five cents each, by addressing the "Commissioner of Patents, Washington, D. C."